United States Patent
Westermann et al.

(10) Patent No.: US 12,041,421 B2
(45) Date of Patent: Jul. 16, 2024

(54) SYSTEM AND METHOD FOR FEATURE MANAGEMENT IN A HEARING AID

(71) Applicant: Widex A/S, Lynge (DK)

(72) Inventors: Soren Erik Westermann, Espergaerde (DK); Svend Vitting Andersen, Espergaerde (DK); Anders Westergaard, Herlev (DK); Niels Erik Boelskift Maretti, Birkerod (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 17/237,483

(22) Filed: Apr. 22, 2021

(65) Prior Publication Data

US 2021/0306775 A1  Sep. 30, 2021

Related U.S. Application Data

(60) Division of application No. 15/864,039, filed on Jan. 8, 2018, now Pat. No. 11,323,826, which is a (Continued)

(51) Int. Cl.
*H04R 25/00* (2006.01)
*H04L 9/40* (2022.01)
*H04W 12/06* (2021.01)

(52) U.S. Cl.
CPC ......... *H04R 25/558* (2013.01); *H04L 63/083* (2013.01); *H04R 25/305* (2013.01);
(Continued)

(58) Field of Classification Search
CPC .. H04R 25/305; H04R 25/505; H04R 25/554; H04R 25/558; H04R 25/70;
(Continued)

(56) References Cited

U.S. PATENT DOCUMENTS

| | | |
|---|---|---|
| 6,424,722 B1 | 7/2002 | Hagen et al. |
| 6,556,686 B1 | 4/2003 | Weidner |

(Continued)

FOREIGN PATENT DOCUMENTS

| | | |
|---|---|---|
| CA | 2 286 269 A1 | 10/1998 |
| DE | 199 49 604 A1 | 5/2001 |

(Continued)

OTHER PUBLICATIONS

International Search Report for PCT/EP2015/065680 dated Jun. 6, 2016 [PCT/ISA/210].

(Continued)

*Primary Examiner* — Huyen D Le
(74) *Attorney, Agent, or Firm* — Sughrue Mion, PLLC

(57) ABSTRACT

A hearing aid service system includes an Internet enabled personal communication device and one or more hearing aids provided with respective transceivers for establishing a wireless connection, whereby the personal communication device becomes a gateway for the hearing aids to a remote server. Each hearing aid includes a processor controlling the operation of the hearing aid, and a memory containing program code for at least one add-on program for the operation of the hearing aid. The server manages user accounts for a plurality of hearing aid users, including managing subscription status for the add-on program. The server creates a subscription status change event for the account upon change of the subscription status for the at least one add-on program and sends a status change instruction to the hearing aids for enabling or disabling one or more of the add-on programs by using the communication device as gateway.

7 Claims, 6 Drawing Sheets

Related U.S. Application Data continuation-in-part of application No. PCT/EP2015/065680, filed on Jul. 9, 2015.

(52) U.S. Cl.
CPC ......... *H04R 25/505* (2013.01); *H04R 25/554* (2013.01); *H04W 12/06* (2013.01); *H04R 25/70* (2013.01); *H04R 2225/39* (2013.01); *H04R 2225/55* (2013.01)

(58) Field of Classification Search
CPC ............ H04R 2225/39; H04R 2225/55; H04L 63/083; H04W 12/06
See application file for complete search history.

(56) References Cited

U.S. PATENT DOCUMENTS

| | | | |
|---|---|---|---|
| 6,658,307 | B1 | 12/2003 | Mueller et al. |
| 6,785,394 | B1 | 8/2004 | Olsen et al. |
| 7,024,000 | B1 | 4/2006 | Gabara et al. |
| 7,200,237 | B2 | 4/2007 | Zhang et al. |
| 7,206,424 | B2 | 4/2007 | Sacha |
| 8,166,312 | B2 | 4/2012 | Waldmann |
| 8,189,830 | B2 | 5/2012 | Hou |
| 8,302,159 | B2 | 10/2012 | Griesdorf et al. |
| 8,712,082 | B2 | 4/2014 | Spieler et al. |
| 8,767,986 | B1 | 7/2014 | Fabry et al. |
| 8,930,067 | B1 | 1/2015 | Green et al. |
| 2002/0054689 | A1 | 5/2002 | Zhang et al. |
| 2004/0214560 | A1 | 10/2004 | Date et al. |
| 2005/0008175 | A1 | 1/2005 | Hagen et al. |
| 2006/0227987 | A1 | 10/2006 | Hasler |
| 2008/0041656 | A1 | 2/2008 | Burrows et al. |
| 2008/0049956 | A1 | 2/2008 | Hou |
| 2011/0188684 | A1 | 8/2011 | Spieler et al. |
| 2013/0177189 | A1 | 7/2013 | Bryant et al. |
| 2013/0308802 | A1 | 11/2013 | Eaton et al. |
| 2015/0127532 | A1 | 5/2015 | Steif et al. |
| 2017/0257713 | A1* | 9/2017 | Westermann ........ H04R 25/554 |
| 2018/0310104 | A1 | 10/2018 | Westergaard et al. |
| 2019/0253816 | A1* | 8/2019 | Pihl ...................... H04R 25/505 |

FOREIGN PATENT DOCUMENTS

| | | |
|---|---|---|
| EP | 0 794 687 A1 | 9/1997 |
| EP | 1 473 969 A2 | 11/2004 |
| EP | 1 145 595 B1 | 12/2007 |
| EP | 1 912 476 A2 | 4/2008 |
| EP | 2 103 180 A2 | 9/2009 |
| EP | 2 106 253 A1 | 10/2009 |
| EP | 2 364 646 A1 | 9/2011 |
| EP | 2 824 941 A1 | 1/2015 |
| WO | 01/15043 A1 | 3/2001 |
| WO | 01/54458 A2 | 7/2001 |
| WO | 02/35884 A2 | 5/2002 |
| WO | 2006/074655 A1 | 7/2006 |
| WO | 2007/098605 A1 | 9/2007 |

OTHER PUBLICATIONS

Written Opinion for PCT/EP2015/065680 dated Jun. 6, 2016 [PCT/ISA/237].

* cited by examiner

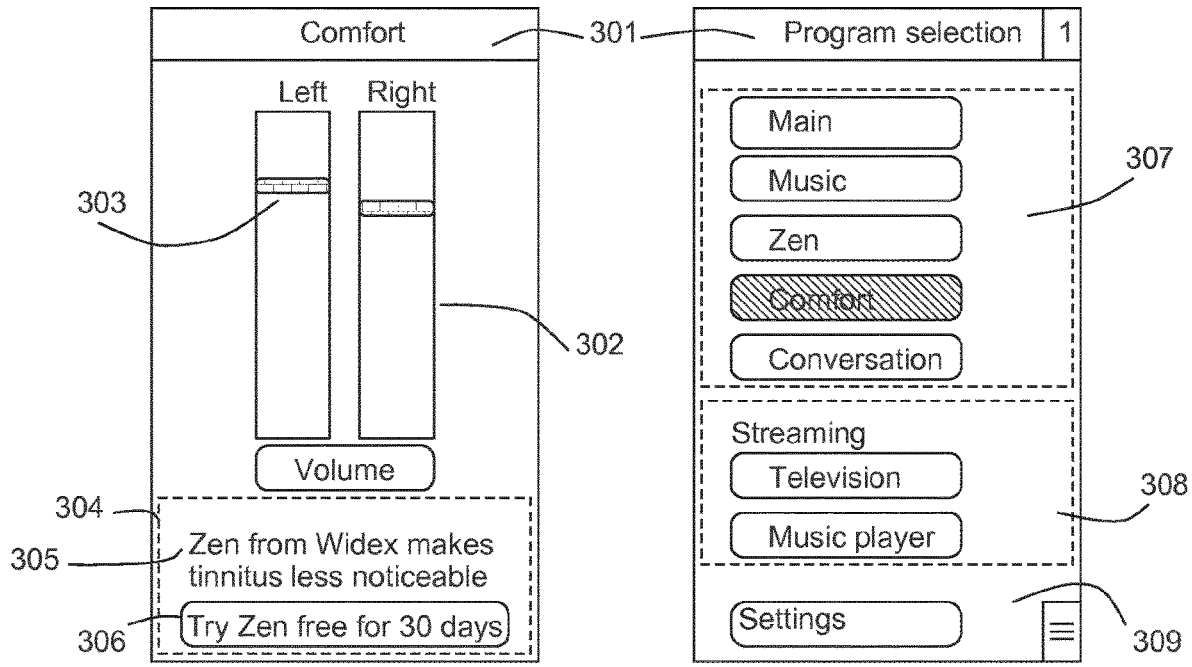
Fig. 6A  Fig. 6B
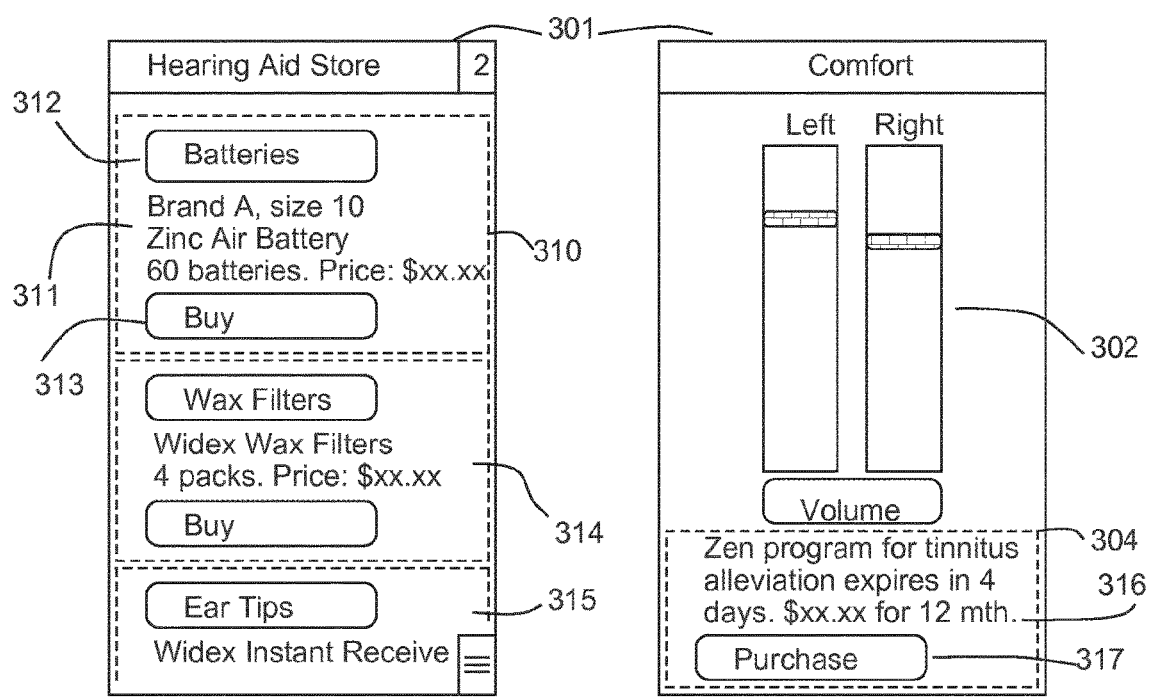
Fig. 6C  Fig. 6D

SYSTEM AND METHOD FOR FEATURE MANAGEMENT IN A HEARING AID

CROSS REFERENCE TO RELATED APPLICATIONS

This application is a Divisional of U.S. Application No. 15/864,039, filed Jan. 8, 2018, which is a continuation-in-part of International Application No. PCT/EP2015/065680 filed Jul. 9, 2015, the contents of all of which are incorporated herein by reference in their entirety.

BACKGROUND OF THE INVENTION

The present invention relates to hearing aids. The invention, more particularly, relates to a method for managing add-on programs for a hearing aid. The invention also relates to enabling and add-on programs in a hearing aid according to subscription.

A hearing aid is an electroacoustic device typically worn in or behind the ear and being designed to amplify sound for the wearer, usually with the aim of making speech more intelligible, and to correct impaired hearing as measured by audiometry. In some countries, hearing aids are considered medical devices, and a hearing healthcare professional or an audiologist identifies the customer needs during a consultancy session and writes data into the hearing aid when adjusting the settings for alleviating a hearing loss.

Recently, hearing aids with wireless connectivity based on an open telecom protocol has reached market. Binaural hearing aids based on proprietary communication protocols have been on the market for decades. The Bluetooth connectivity is the most recent innovation in wireless interfacing for hearing instruments to audio sources such as TV streamers or mobile phones. Even though this is a major achievement, the customization of the hearing aids is still provided by the hearing healthcare professional, who provides a hearing aid with the configuration he recommends for the user, adds one or more add-on programs for the user and sets acclimatization when introducing new hearing system, e.g. like a transposer, for the customer. This means that the user has to take a lot of important decisions about the customization of a new hearing aid during the consultation with the hearing healthcare professional, and this will therefor often become an iterative procedure with multiple consultations.

SUMMARY OF THE INVENTION

The purpose of the invention is to provide a hearing aid managing system assisting the hearing aid user in customizing his hearing aid with add-on services in a way so the user pays for the services being valuable for him and may pass on services held less valuable to him.

This purpose is according to the invention achieved by a hearing aid service system comprising an Internet enabled personal communication device and at least one hearing aid provided with respective transceivers for establishing a wireless connection, whereby the personal communication device becomes a gateway for said at least one hearing aid to a remote server accessible over the Internet. The at least one hearing aid includes a processor controlling the operation of the hearing aid, and a memory containing program code for at least one add-on program for the operation of the hearing aid. The remote server is managing user accounts for a plurality of hearing aid users, including managing subscription status for said at least one add-on program for the operation of said at least one hearing aid. The remote server creates a subscription status change event for the account upon change of the subscription status for said at least one add-on program. Upon the occurrence of the subscription status change event, the remote server sends a status change instruction to said at least one hearing aid for enabling or disabling one or more of said at least one add-on programs according to the change of the subscription status by using the personal communication device as gateway. Hereby, the user may have an opportunity to try an add-on program for a predetermined period of time as a free trial, and if he regards the test period as successful, he can easily start a subscription based on the add-on program and as easily discontinue the subscription again without having to show up in a traditional consultation at a hearing healthcare professional.

According to a second aspect of the invention there is provided a hearing aid comprising a transceiver for establishing a wireless connection with a personal communication device becoming a gateway to a remote server accessible over the Internet. Furthermore the hearing aid comprises a processor controlling the operation of the hearing aid, and a memory containing program code for at least one add-on program for the operation of the hearing aid. The processor is via the transceiver adapted to receive a status change instruction from the remote server using the personal communication device as gateway and enables or disables at least one add-on program according to the received status change instruction.

According to a third aspect of the invention there is provided a method for managing software programs in a hearing aid provided with a transceiver for establishing a wireless connection to an Internet enabled personal communication device thereby becoming a gateway for the hearing aid to a remote server accessible over the Internet, said hearing aid includes a processor controlling the operation of the hearing aid, and a memory containing program code for at least one add-on program for the operation of the hearing aid, said remote server is managing user accounts for a plurality of hearing aid users. Furthermore, the method comprises steps of managing, in said remote server, subscription status for at least one add-on program of said at least one hearing aid, creating, in said remote server, a subscription status change event for the account upon change of the subscription status for said at least one add-on programs, sending a status change instruction from the remote server using the personal communication device as gateway to said hearing aid upon the occurrence of the subscription status change event, and enabling or disabling, in the hearing aid, one or more of said at least one add-on programs according to the status change instruction received from the remote server.

According to a fourth aspect of the invention there is provided a computer-readable storage medium having computer-executable instructions, which, when executed in an Internet enabled personal communication device is acting as a gateway between at least one hearing aid and a remote server accessible over the Internet, being adapted to receive a status change instruction from the remote server upon the occurrence of the subscription status change event, and to forward instructions to said at least one hearing aid for enabling or disabling one or more of said at least one add-on programs according to the change of the subscription status.

According to a fifth aspect of the invention there is provided an Internet enabled personal communication device for establishing a wireless connection to at least one hearing aid, and thereby becoming a gateway for said at least one hearing aid to a remote server accessible over the Internet. The personal communication device is adapted for displaying on a hearing aid control application software interface a notification for warning the user that the subscription on said at least one add-on program is going to expire.

According to a sixth aspect of the invention there is provided a server adapted to communicate with said at least one hearing aid via the Internet using a personal communication device as gateway. The server is adapted to manage user accounts for a plurality of hearing aid users, and this includes managing subscription status for at least one add-on program for the operation of said at least one hearing aid. The remote server creates a subscription status change event for the account upon change of the subscription status for said at least one add-on programs, and upon the occurrence of the subscription status change event, the remote server sends a status change instruction to said at least one hearing aid for enabling or disabling one or more of said at least one add-on programs according to the change of the subscription status by using the personal communication device as gateway.

BRIEF DESCRIPTION OF THE DRAWINGS

The invention will be described in further detail with reference to preferred aspects and the accompanying drawing, in which:

FIGS. 6A-6E illustrate an embodiment for the hearing aid control application software interface offering priority items for sale according to the invention.

DETAILED DESCRIPTION

Figure 1:
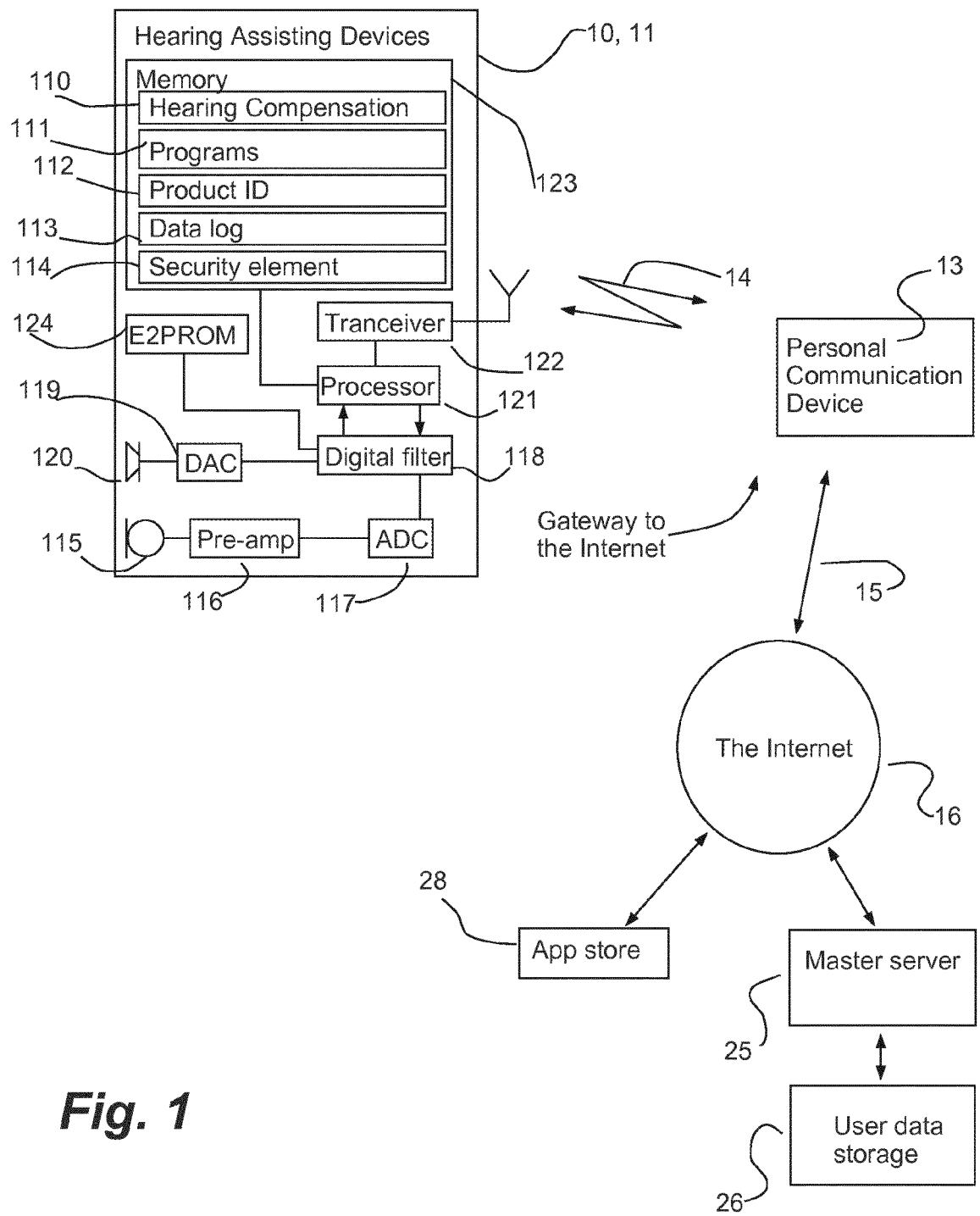
FIG. 1 illustrates schematically a data management system according to a first embodiment of the invention.

Reference is made to FIG. 1, which schematically illustrates a data management system according to a first embodiment of the invention. Prior to use, the settings of the hearing aid are set and adjusted by a hearing care professional according to a prescription. The prescription is provided by a hearing healthcare professional and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

Hearing aids are often provided to a hearing impaired user as a set of binaural hearing aids 10, 11. The hearing aid 10, 11 comprises an input transducer 115 or microphone for picking up the acoustic sound and converting it into electric signals. The electric signals from the input transducer 115 are amplified in a pre-amp amplifier 116 and led to an Analog-to-Digital converter (ADC) 117 for converting the analog input signal into a digital signal. The digital output signal from the Analog-to-Digital converter 117 is fed to a digital filter 118 adapted for amplifying and conditioning of the processed signal according to a predetermined setting set by a hearing healthcare professional. The output from the digital filter 118 is fed to a Digital-to-Analog converter (DAC) 119 for converting the digital processed signal into an analog output signal for reproduction by an output transducer 120 or speaker. Preferably Delta-Sigma-conversion is applied in the Digital-to-Analog Conversion so the electrical output signal is formed as a one-bit digital data stream fed directly to the output transducer 120, i.e. the output converter is driven as a class D amplifier.

The digital filter 118 may advantageously include a filter bank splitting up the signal into a plurality of filter bands (often in the range of 3-15 bands or channels) for being processed individually and subsequently combined into the output from the digital filter 118. A processor 121 monitors and controls the operation of the digital filter 118 according to the settings for alleviating a hearing loss by amplifying sound at frequencies in those parts of the audible frequency range where the user suffers a hearing deficit. These settings are provided by the hearing healthcare professional, and the settings are stored as a data file 110 in a part of a hearing aid memory 123. In an embodiment, the hearing aid memory 123 is an Electrically Erasable Programmable Read-Only Memory (E2PROM), which is a non-volatile memory, i.e. the type of memory that retains its data when its power supply is switched off. It may be achieved that only authorized personnel may edit settings for alleviating a hearing loss by applying an appropriate data access control.

The hearing aid memory 123 furthermore includes memory space 111 for storing hearing aid programs or activation codes and parameters for activating one or more hearing aid programs provided as embedded software in the hearing aid 10, 11. As these parameters relate to up and down grading of hearing aid features, it is evident that the access to editing these parameters shall be limited by applying an appropriate data access control.

The hearing aid memory 123 includes memory space 112 for storing Product ID, which may include manufacturer name, product type and serial number, and furthermore identification of the current firmware version. It is evident that an unauthorized person must not be able to change the manufacturer name, product type and serial number. This may be obtained by coding these data into the chip. Alternatively it may be achieved that only authorized personnel may edit Product ID data by applying an appropriate data access control.

Finally the hearing aid memory 123 includes memory space 113 for storing log data for the hearing aid operation and acoustical environment, and memory space 114 for storing a security element, such as root certificates. The hearing aid 10, 11 generates log data automatically, and the data may be read out during a consultancy session by a hearing healthcare professional when adjusting the settings for alleviating a hearing loss, or by uploading to a central server when the manufacturer of the hearing aid 10, 11 prepares for a firmware update.

The processor 121 is connected to and controls the operation of a transceiver 122. The transceiver 122 connects the hearing aid 10, 11 to a personal communication device 13 via a wireless connection 14, such as a per se known wireless communication standard like Bluetooth™ Low Energy or another appropriate protocol. The benefit of using Bluetooth™ Low Energy is that many different personal communication devices 13 like smartphones, hearing aid streamers, tablet PC's and laptops already support the standard, whereby the hearing aid 10, 11 may be paired with one of these personal communication devices 13 and use the personal communication device 13 as a gateway to the Internet. On the same time the power consumption for a transceiver 122 based upon Bluetooth™ Low Energy will be acceptable for a hearing aid design.

The personal communication device 13 according to the invention is Internet enabled, which means that the personal communication device 13 may access the Internet 16 via a connection 15. The connection 15 is preferably a wireless Internet connection, or a cellular data connection (e.g. WCDMA or LTE). Advantageously, the personal communication device 13 has the ability to download and launch application software from a remote server on the Internet, e.g. an app store 28. Furthermore, the personal communication device 13 will be able to access via the Internet 16 a master server 25 having user data storage 26 for maintaining and storing hearing aid user accounts.

A non-volatile memory 124, e.g. an E2PROM memory or a flash memory, is used to store general chipset configuration parameters and individual user profile data.

The term "app" is short for "application software" which is a set of one or more programs designed to carry out operations for a specific application. Application software cannot run on itself but is dependent on system software to execute.

Figure 2:
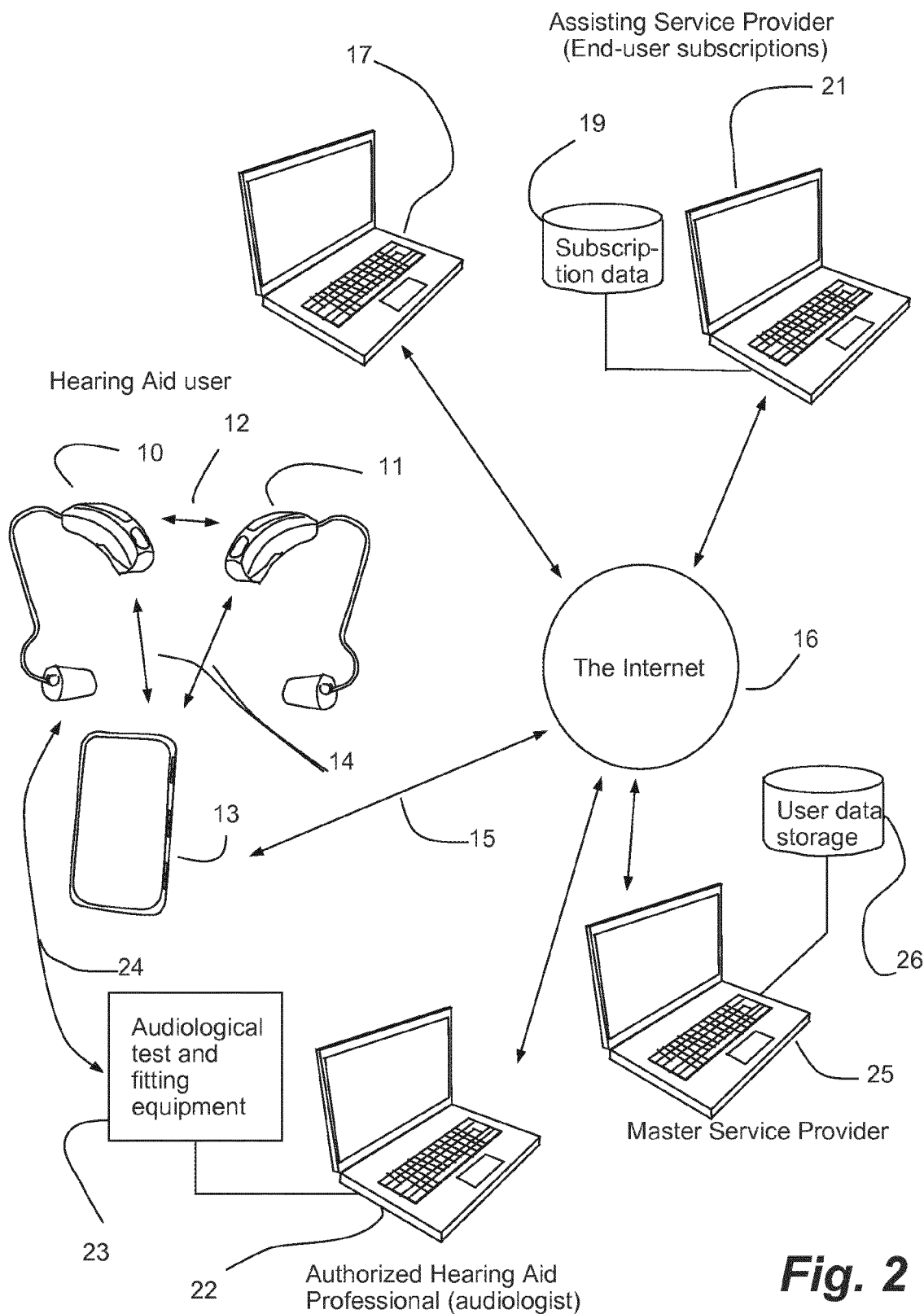
FIG. 2 illustrates schematically a data management system according to a second embodiment of the invention.

FIG. 2 shows two hearing aids 10 and 11, and these are preferably provided as a set of binaural hearing aids having an inter-ear communication channel 12, advantageously based on a proprietary communication protocol or the Bluetooth™ Low Energy protocol, which is preferred for the communication between two hearing aids 10 and 11 and the personal communication device 13—here shown as a smartphone. By using a proprietary communication protocol for the inter-ear communication channel 12, it is possible to optimize the inter-ear communication channel 12 with regard to power consumption, while by using the Bluetooth™ Low Energy protocol for the inter-ear communication channel 12, it is possible to reduce the number of radios required in the hearing aid. The two hearing aids 10 and 11 are illustrated as Behind-The-Ear hearing aids having customized ear plugs. However the invention is applicable for any type of hearing aid being able to communicate with the personal communication device 13 via the wireless connection 14.

Furthermore, the hearing aid user may from a computer 17 via an appropriate Internet connection access the master server 25 having user data storage 26 for maintaining and storing hearing aid user accounts. Accessing user data stored on the master server 25 requires that the hearing aid user has the required access rights.

Entities distributing the hearing aids from the manufacturing companies to the hearing impaired customer may, as assisting service providers dealing with e.g. end-user subscriptions from a computer 21 via an appropriate Internet connection, access the master server 25 having user data storage 26 for maintaining and storing hearing aid user accounts—or at least relevant parts of the hearing aid user accounts. The computer 21 is connected to a data storage 19 containing subscription data for a plurality of hearing impaired customers being customers at the entity. The entity may be a specialty store, a factory owned store, a supermarket, an Internet shop, a membership warehouse club, a discount store or the like. Accessing user data stored on the master server 25 requires that the entity representative has proper/appropriate access rights.

Finally, authorized hearing healthcare professional or audiologists may from a computer 22 via an appropriate Internet connection access the master server 25 having user data storage 26 for maintaining and storing hearing aid user accounts. Accessing user data stored on the master server 25 requires that the authorized hearing healthcare professional has the appropriate access rights. The authorized hearing aid professionals have audiological test and fitting equipment 23 for measuring and estimating the hearing loss of the customer, and subsequently fitting a set of hearing aids 10, 11 compensating for the unique hearing loss of the customer. As the fitting process shall fulfil the customer's needs, the process will normally take place as an interactive and iterative process. Therefor the audiological test and fitting equipment 23 is adapted for wireless communication directly with hearing aids 10, 11 via a data link 24. The data link 24 may be provided by means of a proprietary communication protocol used for the inter-car communication channel 12, or by means of the Bluetooth™ standard, e.g. according to Bluetooth™ Low Energy protocol, which is preferred for the communication between two hearing aids 10 and 11 and the personal communication device 13.

Figure 4:
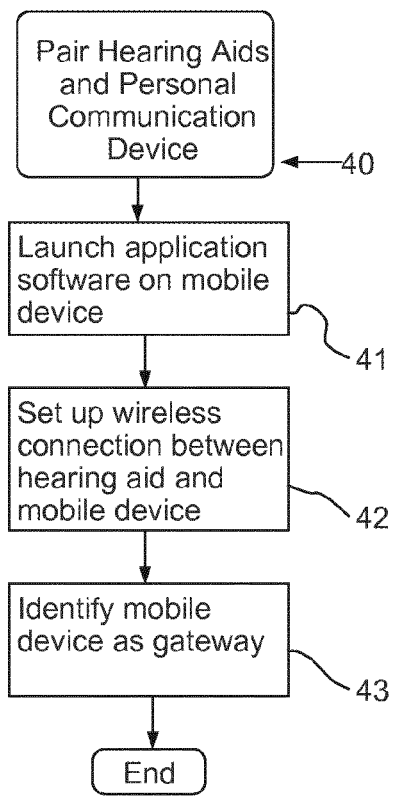
FIG. 4 illustrates a flow chart for the pairing of a hearing aid and the personal communication device according to one aspect of the invention.

In step 40 of FIG. 4, the user pairs a set of hearing aids 10, 11 to a personal communication device 13, and the pairing procedure according to Bluetooth™ Low Energy protocol is well known. However, the user may advantageously choose to use special hearing aid software running on the personal communication device 13 adapted to control the pairing—as shown in step 41—and this software may either be embedded in the personal communication device 13 from the factory or be downloaded to the personal communication device 13 from the app store 28. The software app includes information about how to access (including the Internet address) the master server 25. Upon pairing in step 42 of the set of hearing aids 10, 11 and the personal communication device 13, the set of hearing aids 10, 11 identify themselves based upon information present in the product ID file 112 in the hearing aid memory. The software app running on the personal communication device 13 uploads in step 43 these data to the master server 25 based upon access information contained in the software app. Hereby the master server 25 becomes notified about that pairing has taken place between the set of hearing aids 10, 11 and the personal communication device 13, and the set of hearing aids 10, 11 is identified by manufacturer, hearing aid model, serial number, software or firmware version, and the personal communication device 13 is identified (phone number and/or IP address) as gateway for accessing the set of hearing aids 10, 11.

Preferably, the pairing is done by bringing the personal communication device 13 via the launched application software into a searching mode, in which the personal communication device searches for hearing aids 10, 11 in pairing mode. Preferably a hearing aid 10, 11 is brought into pairing mode for a period of time by switching the hearing aid 10, 11 on. The personal communication device 13 may list the hearing aids 10, 11 identified in pairing mode. Then the pairing preferably takes place by requesting the hearing aid 10, 11 to communicate a pairing code in an auditory communication, e.g. as an audio message, to the hearing aid user, and when the user has successfully entered the pairing code via a graphical user interface on the personal communication device 13, the pairing mode has been successfully completed. If the set of hearing aids 10, 11 includes a second one, the pairing step is repeated for this one, too. Preferably, the hearing aids 10, 11 provide an audio indication to the user when the hearing aid enters the pairing mode, and preferably also when the pairing mode has been successfully completed.

Upon setting up a wireless connection between at least one hearing aid 10, 11 and the personal communication device 13 under guidance of application software, the master server 25 identifies in the user account the personal communication device 13 as a gateway for the hearing aid 10, 11 to the Internet 16. So far only the set of hearing aids 10, 11 and the personal communication device 13 are identified in an anonymous user account.

Figure 5:
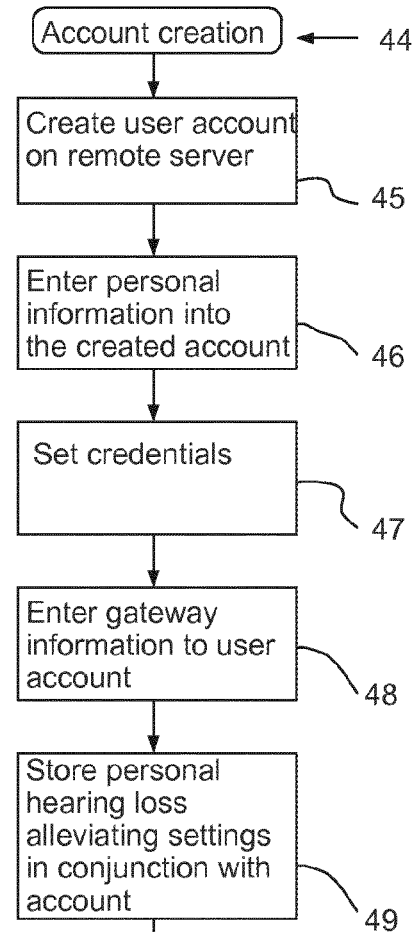
FIG. 5 illustrates a flow chart for the creation of a user account according to one aspect of the invention.

Referring to FIG. 5, it shall be explained how the user completes the account set-up. Starting at step 44, the user creates a user account on the remote server 25 accessible over the Internet from the Internet enabled computer device 17, e.g. a laptop, tablet PC or a smartphone. The user enters a URL—preferably provided on the hearing aid sales package—into an appropriate browser window in order to create the account at the master service provider. In the web page opened, the user may create a new account in step 45 and enter appropriate personal information in step 46. The kind of personal information included in the user account will later on be explained with reference to FIG. 3. As a part of the account set up, the user is in step 47 invited to set credentials for the account, and these credentials may in one embodiment include a username and a password—both specified by the user. Now the account has been created, the user is allowed to log off, and later on log on again for complementing the account with additional data. During the account setup, in step 48 the user is invited to identify a gateway to his hearing aids 10, 11. The personal communication device 13 serves this purpose, and the user may identify the personal communication device 13 by means of e.g. its phone number or IP-address.

Once the personal communication device 13 has been identified as a gateway, the remote server 25 contacts the personal communication device 13 in order to verify its role as a gateway. This contact may preferably be done via the software app running on the personal communication device 13, and when the user has verified the gateway data, the personal communication device 13 starts to upload data about the hearing aids 10, 11, such as serial number, software version and information about special hardware to the server 25. Normally the hearing aids 10, 11 have been fitted in order to alleviate the hearing loss of the hearing aid user, and as a part of the account set-up, the personal communication device 13 reads data from the hearing aids 10, 11, and in step 49 transfers data to the remote server 25 for storing settings for alleviating the hearing loss in conjunction with the user account comprising of a data set consisting of data fields 31-39.

Hereafter the remote server 25, when the hearing aids 10, 11 are online, will via the personal communication device 13 compare the settings for alleviating the hearing loss stored in the hearing aids 10, 11 and in the user data storage 26, and keep these settings synchronized. Hereby these data will be kept updated no matter whether the hearing aids 10, 11 have been updated in an off-line fitting process, or whether a new fine-tuning has been performed orchestrated by the remote server 25. The user is allowed to log off, and later on log on again for editing existing data in the account or for adding further data.

The data set in a user account includes a personal information data field 31, which typically is the first data field filled out by the user when creating an account. The personal information includes name, address and additional contact data like phone number and e-mail address. A delivery address data field 30 defines the delivery address for hardware to be delivered to the hearing aid user. This hardware may include hearing aids returned from service, replacement hearing aids, batteries, wax guards, hearing aid drying boxes and other items ordered from the master service provider or the assisting service provider. The delivery address is specified by the owner of the account and may be identical to the home address identified in the personal information data field 31 or may identify a preferred supermarket in case the account is linked to a membership in a warehouse club.

In a social security data field 33, the user may enter his birthday information and social security number, which may be used by the social authorities in case these are committed to reimburse a part of the sales prize or subscription fees.

Data settings for configuring a hearing aid 10, 11 may be stored in configuration data field 32. These data setting may be loaded into the non-volatile memory 124 in the hearing aid 10, 11 via the personal communication device 13 acting as gateway between the server 25 and the hearing aids 10, 11.

In an accounting data field 34, the master service provider, the assisting service provider, and the authorized hearing aid professional may enter respective service agreements and the user may enter billing details, such as that an invoice is preferred or that an amount to be drawn from a specified credit card is preferred. The service agreements may refer to a specified fitting session, a hearing test, purchase of a specified set of hearing aids, subscription to a specified set of hearing aids, upgrade of an existing set of hearing aids, batteries, or replacement parts. The user has the right to approve the service agreements and enter billing details, while the service providers may enter service agreement details as price and conditions supported by one or more documents and use entered billing details for their own accounting. The accounting data field 34 will only contain one service agreement, and if several service agreements are initiated, supplementing accounting data fields 34 will be created. Only parties to a service agreement do have Data Retrieval Rights to these data fields 34.

When the authorized hearing healthcare professional or audiologist tests the hearing of a client, he obtains the results in an audiogram, which is a graph showing the hearing loss measured in decibels for standardized frequencies in Hertz. The threshold of hearing is plotted relative to a standardized curve that represents "normal" hearing, in dB (HL). According to the invention the authorized hearing aid professional may store the hearing loss characterization in a dedicated Hearing Loss Characterization data field 35, whereby the authorized hearing aid professional or another authorized hearing aid professional on a later point of time may assess changes in the hearing capability of the client.

When the authorized hearing aid professional has determined the hearing loss of his client and an appropriate hearing aid has been chosen, the authorized hearing aid professional sets the hearing aid compensation profile parameters in an interactive dialogue with the client by using the audiological test and fitting equipment 23 communicating directly with hearing aids 10, 11 via the wireless data link 24. Once the fitting has been completed, the settings are stored in the data file 110 defining the hearing compensation profile in the hearing aid memory 123 in each of the hearing aids 10, 11. Once the settings have been updated in the hearing aid 10, 11, and the hearing aid 10, 11 identifies a gateway to the Internet 16 via the personal communication device 13, it seeks to establish a secure connection to the master server 25 for transferring these data to the data field 36 for the settings of the hearing compensation profile for each of the hearing aids 10, 11. The hearing aids are programmed to automatically place a copy of settings of the hearing compensation profile for each of the hearing aids 10, 11 in an associated user account when the settings have been updated off-line (not using the personal communication device 13 as gateway) by means of fitting equipment 23.

Preferably, the data field 36, in which the hearing compensation profiles are stored, includes historical data for the hearing compensation profile settings. Hereby the user may request a previous setting if he for some reasons finds the current setting problematic in a specific sound environment or situation. The request of re-importing a previous setting may be initiated from an app on the personal communication device 13 acting as gateway.

Also the master server 25 will be able to set up a secure connection to the hearing aids 10, 11 for loading settings of the hearing compensation profile into one or more of the hearing aids 10, 11. The trigger for doing such a push of settings may as mentioned be that the user has requested a previously used setting, or that the user has received one or more replacement hearing aids directly from factory, and that these new hearing aids once these are connected to the gateway shall be equipped with appropriate programs and equipped with the appropriate hearing compensation profile settings. This will make a replacement operation easier for the client, as the new hearing aids 10, 11 can be delivered by a postal or shipping company and the preparation and personalization of the hearing aids 10, 11 takes place online using a personal communication device 13 as a gateway.

The authorized hearing aid professional has via his login Data Update Rights to the Hearing Loss Characterization data field 35 and the hearing compensation profile data field 36, while the owner of the account has Data Retrieval Rights to the Hearing Loss Characterization data field 35.

Preferably, the hearing aids 10, 11 are programmed to automatically upload identification details for the hearing aid to the master server 25 when the hearing aids 10, 11 are linked to a user account by means of the gateway formed by the personal communication device 13. These product ID data are read from the product ID file 112 in the hearing aid memory 123 and uploaded via the gateway and the Internet to the master server 25 and into data field 37 of the user account.

For each user account there is provided a data field 38 containing security elements as credentials for access to one or more data fields in the hearing aid user account and secure keys for establishing a secure connection between the master server 25 and the hearing aids 10, 11.

Figure 3:
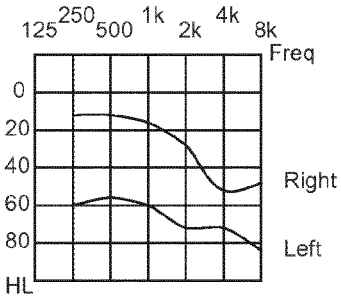
FIG. 3 illustrates schematically the data structure of a user account handled in the data management system according to an embodiment of the invention.

The remote server 25 is managing user accounts as explained with reference to FIG. 3, and for tracking the current subscription status for add-on features for the hearing aids 10, 11, and this subscription status is recorded and maintained in a data field 39. The term add-on feature or plug-in feature refers to a software component that adds a specific feature to an existing software application. When an application supports plug-ins, it enables customization. An example on such an add-on feature could be a program for tinnitus alleviation. Other examples could be hearing test programs for testing the hearing aid users hearing loss or training programs for improving speech intelligibility or to improve spatial hearing (ability to differentiate Inter-aural Level Differences (ILD)). The hearing aid user may activate or download the test or training programs, and the development or progress may be automatically up-loaded to the user account on the server 25, and a remote hearing healthcare professional may as a part of the subscription monitor the test and training progress via the user account.

Turning to FIGS. 6A-6E and 7, the hearing aid service system discussed with reference to FIGS. 1 and 2 pushes an offer relating to a new hearing aid feature to the personal communication device 13. This push or advertisement in step 320 in FIG. 7 may be triggered by a market campaign at the service provider for a new feature or a feature valued by hearing aid users being in a similar life situation or environmental situation as the group of users targeted by the service provider pushing the offer.

Figure 6E:
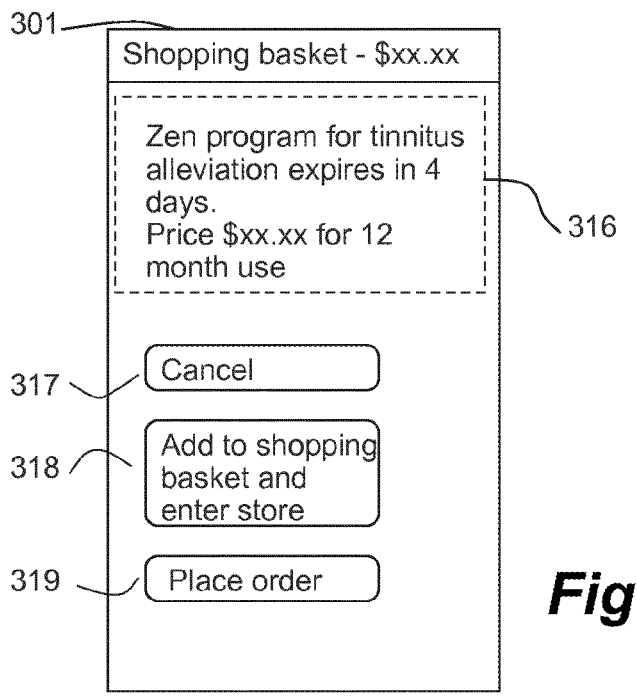
Figure 7:
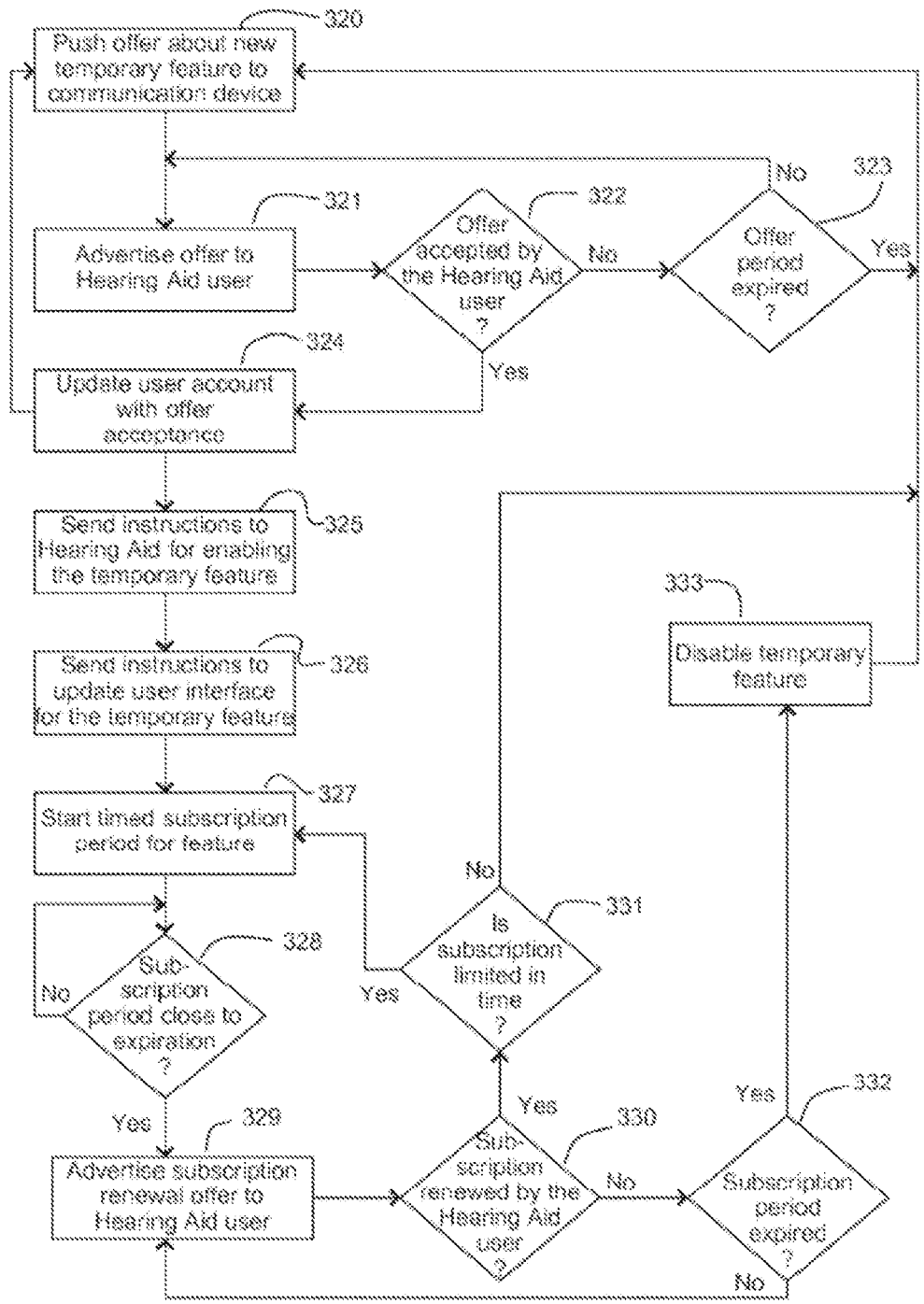
FIG. 7 illustrates a flow chart illustrating the method for offering add-on programs for sale in a hearing aid service system.

FIGS. 6A-6E show an embodiment for the hearing aid control application software interface used in the Internet enabled personal communication device 13 according to the invention. The hearing aid control application software is illustrated in five schematic screenshots shown in FIG. 6A-6E for a touch screen display. The first screenshot shown in FIG. 6A illustrates a so-called entry screen which is entered when the app is opened.

As seen here, the entry screen comprises a header 301 indicating the current operation between the hearing aids 10, 11 and the communication device 13. Here the header 301 indicates that the "comfort" program for the hearing aids 10, 11 is activated. Below the header 301, there is provided a control area 302 for setting the volume for the sound output by the hearing aids 10, 11. The two columns refer to the left and the right hearing aid 10, 11, respectively. Each of the two columns has a bitmap level indicator 303, which can be operated individually by dragging the bitmap level indicator 303 by means of one finger or together by having contact to both bitmap level indicators 303 simultaneously.

Preferably, the personal communication device 13 advertises in step 321 the offer pushed from the server 25 in a dedicated service display area 304 positioned below the control area 302. In the dedicated service display area 304, the service provider may offer special services or hints to the hearing aid user. As seen, the dedicated service display area 304 may include an offer description 305—here the user is offered a Zen™ program for tinnitus alleviation, and a selection element 306 for accepting a free trial. The selection element 306 will provide access to terms and conditions, and an assisted set-up of the Zen™ program.

The second screenshot shown in FIG. 6B illustrates a so-called program selection screen, in which the user may select between programs and audio sources available. This is indicated in the header 301. The user may e.g. enter the program selection screen from the entry screen by swiping his thumb across the display from left to right. Selectable programs are clustered in a program area 307, selectable audio streaming sources are clustered in an audio streaming source area 308, and further settings are available in a setting area 309. Selections are made by touching one of the labelled controls. If one of the programs or streaming sources is selected or if the return area in the lower right corner is touched, the app entry screen shown in FIG. 6A with the header 301 will reflect the selected program or streaming source.

The third screenshot shown in FIG. 6C illustrates a so-called hearing aid store screen, which may be entered by the user from the program selection screen by swiping his thumb across the display from left to right. A header 301 indicates that the user has entered the hearing aid store, and the products are clustered into a battery category, a wax filter category, and car tip category, and further categories may be available by scrolling out of the screen in downwards direction. Each of the product categories (batteries, wax filters, car tips etc.) has a dedicated product display area 310, 314 and 315 including a product offer description 311 in which the user is offered a priority sale offer for the category. For batteries, this offer may be accepted by touching a selection element 313 labelled "Buy", or further offers in the category may be accessed by touching a selection element 312 labelled "Batteries". The same is valid for other categories. The hearing aid store may offer mechanical replacement parts, add-on programs for the operation of the hearing aid, and test and training programs for use with the hearing aid.

When the communication device 13 displays the screenshot shown in FIG. 6A, its processor examines in step 322 (FIG. 7) whether the user accepts the displayed offer. If the user has not accepted the offer yet, the processor of the communication device 13 checks in step 323 whether the offer period has expired—if not, the communication device 13 continues to display the offer in the dedicated service display area 304. If the offer period has expired, the communication device 13 notifies the remote server 25 about this, and the server 25 may in step 320 push a new offer to be displayed in the dedicated service display area 304 of the communication device 13.

In case the communication device 13 in step 322 detected that the user had accepted the offer by touching the selection element 306, the communication device 13 seeks a confirmation from the hearing aid user, and when the acceptance of the offer has been confirmed, the communication device 13 notifies the server 25 about the purchase order. The server 25 managing a plurality of hearing aid user accounts updates the subscription status for the add-on program offered to and accepted by the hearing aid user. The remote server 25 creates a subscription status change event for the accepted add-on program. When the user accepts the offered add-on program, a status change event will update the user account in step 324, and cause billing—if required—of the user for the new service, pushing a new offer in step 320 to be displayed in the dedicated service display area 304 of the communication device 13, activating or enabling in step 325 the temporary add-on program in the one or more hearing aid 10, 11 associated with the user account, updating the user interface of the app on the personal communication device 13 in step 326 in order to support the new add-on program, and starting of a timed subscription period in step 327. An expiry date for a timed free trial will be set in the server 25 similarly to an expiry date set for a subscription period without automatically renewal—normally just shorter. Reaching the expiry date will cause a status change event based upon the calendar data. Preferably, an alert warning the hearing aid user about the approaching expiry date will be set, too.

Preferably, the remote server 25 sends a status change instruction to the hearing aid 10, 11 when the subscription status change event occurs for enabling or disabling the add-on program according to the change of the subscription status by using the personal communication device 13 as gateway. The processor 121 of the hearing aid 10, 11 receives the status change instruction, interprets the instructions and sets appropriate flags or stores required software programs in the non-volatile memory 124 of the hearing aid 10, 11, and/or in an appropriate memory of the personal communication unit 13 for providing the accepted add-on program functionality for the hearing aid user.

The activation of the add-on program may also in step 326 include updating the user interface provided by the app shown in FIG. 6A-6E. In FIG. 6B, the Zen™ program control is shown in the program area 307. In case the free trial expires for the Zen™ program without entering a subsequent subscription, the Zen™ program control will disappear from the program area 307 as a part of the disabling process. When selecting the Zen™ program in the app, the hearing aid user will be able to access settings for controlling his preferences in terms of pitch, tempo and volume. The Zen™ program includes several Zen styles in order to avoid that the music program become monotone and annoying.

According to one embodiment of the invention, the server 25 monitors in step 328 the status of the free trial period, and when the user has had the possibility to experience the add-on program for some time, the personal communication device 13 advertises in step 329 an offer to convert the free trial of the Zen™ program to a subscription on the same. For one month period of free trial, the converting offer may be advertised one week prior to expiry. The offer has been pushed from the server 25 and is displayed in the dedicated service display area 304 positioned below the control area 302 as shown in FIG. 6D.

The communication device 13 examines in step 330 whether the user accepts the displayed offer. If the user has not accepted the offer yet, the processor of the communication device 13 checks in step 332 whether the subscription period has expired—if not, the communication device 13 continues in step 329 to display the offer in the dedicated service display area 304. If the offer period in step 332 has expired, the communication device 13 notifies the remote server 25 about this, and the server 25 disables in step 333 the temporary add-on program in the one or more hearing aids 10, 11 associated with the user account, updating the user interface of the app on the personal communication device 13 by removing the controls for the temporary add-on program. Hereafter, a new offer may in step 320 be displayed in the dedicated service display area 304 of the communication device 13.

If the communication device 13 in step 330 detects that the user has accepted the displayed offer, this is communicated to the remote server 25, and in step 331, the server 25 detects, based on the user input to the communication device 13, whether the acceptance of the add-on program is directed towards a subscription that has to be renewed periodically, or a permanent purchase of the add-on program associated with the present set of hearing aids 10, 11. If a permanent purchase has been accepted, the server 25 enables the add-on program permanently in the hearing aids 10, 11 without setting expiry dates or counter, bills the user for the change of status for the add-on program, and prepares for a new offer to be displayed in step 320. If a subscription has been accepted, the server 25 enables the add-on program in the hearing aids 10, 11 and sets an expiry date, bills the user for the change of status for the add-on program, and starts a timed period in step 327. Furthermore the server 25 prepares for a new offer to be displayed in step 320.

When enabling and disabling add-on programs over the Internet for Internet enabled hearing aids according to the invention, and when providing these add-on programs for a free trial period or on a subscription that has to be renewed periodically, there is a risk of unauthorized use in case the user accepts the offer and afterwards disconnects the hearing aid 10, 11 from the Internet by disconnecting the gateway.

According to one aspect of the invention, the processor 121, e.g. upon reception of a notification that the subscription on the add-on program is going to expire in step 229, starts a counter in the hearing aid 10, 11 counting the number of switch off events since last connection to said remote server 25, and if the number in the counter exceeds a predefined threshold, the processor 121 disables said at least one add-on program.

The fourth screenshot shown in FIG. 6D illustrates the entry screen also shown in FIG. 6A. The difference is that the dedicated service display area 304 provides a sale offer to the hearing aid user, where the offer is based upon a 30 days free trial for the Zen™ program for tinnitus alleviation being close to expiration—only four days are left for the free trial period. The user accepts the sale offer, the fifth screenshot shown in FIG. 6E is entered, and an extended explanation of the sales offer in shown in an item area 316 of the shopping basket. The user is here offered three controls—a first control 317 for cancelling the transaction, a second control 318 for continuing shopping by going back to the hearing aid store for adding further items to the shopping basket, and a third control 319 for completing the purchase and placing the order.

An add-on program or a plug-in is a software component that adds a specific feature to an existing software application. When the device software supports plug-ins, it enables customization. Plug-ins are well known from computing where they are used for adding new features such as hardware drivers, or the ability to utilize a new file type such as a new multimedia format. For hearings aids, add-on programs or plug-ins may serve multiple purposes, e.g. to enable third-party developers to create abilities which extend an application, or to support easily adding new features or temporary features. This may enable customization of hearing aids, new distribution concepts for hearing aids where the hearing aid user subscribes to or leases a hearing service including periodical circulation of the hearing aids—the hearing aid user may then have access to two sets of hearing aids—one set in use and one set in service with the sets periodically swapped e.g. every second month.

As mentioned above, Zen™ program is a music program providing tinnitus relief. The music program is embedded into the hearing aids 10, 11, and may be enabled temporarily for a free trial period, for a subscription period for e.g. one year, or permanently for the lifetime of the hearing aid or for the hearing aid service. The music program helps tinnitus sufferers relax and makes tinnitus less noticeable. The music program is inspired by the relaxing effect of certain types of music, and is in the preferred embodiment based on what is known as fractal technology, by playing random, chime-like tones.

Traditionally, the hearing care professional has been adjusting the Zen™ program according to the user preferences in terms of pitch, tempo and volume.

When activating Zen™ program, some parameters have to be set. As tinnitus is a pathological state, and the concept Zen™ requires knowledge about the tinnitus tone heard by the hearing aid user. For this purpose, the app installing the music program controls a tone generator allowing the hearing aid user to slowly sweep through the audible spectrum and identify the tone best fitting the tinnitus tone.

Other add-on programs may include various locator programs e.g. including a speech tracer, firmware supporting certain accessories, an audibility extender or a speech enhancer.

The invention claimed is:

1. A hearing aid comprising
   a transceiver for establishing a connection to a remote server accessible over the Internet, using a personal communication device as a gateway,
   a processor controlling the operation of the hearing aid, and
   a memory containing program code for at least one add-on program for the operation of the hearing aid;
   wherein the processor via the transceiver is adapted to receive a status change instruction from the remote server via the personal communication device acting as gateway; and
   wherein said processor enables or disables the at least one add-on program according to the received status change instruction.

2. The hearing aid according to claim 1, adapted to respond to the receipt of the status change instruction from the remote server by disabling one or more of said at least one add-on programs stored in the memory.

3. The hearing aid according to claim 1, wherein it further comprises a memory element for storing a security element for establishing a secure connection to the remote server.

4. The hearing aid according to claim 3, and being adapted to receive the status change instruction from the remote server via an established secure connection.

5. The hearing aid according to claim 1, wherein the processor upon reception of the status change instruction, interprets the instruction and sets appropriate flags in the memory for providing the accepted add-on program functionality for the hearing aid user.

6. The hearing aid according to claim 1, wherein the processor upon reception of the status change instruction, interprets the instruction and stores required software programs in the memory for providing the accepted add-on program functionality for the hearing aid user.

7. The hearing aid according to claim 1, wherein said personal communication device is a smartphone.

* * * * *